J. A. DEADY.
TROLLEY WHEEL.
APPLICATION FILED OCT. 3, 1910.
992,484.
Patented May 16, 1911.
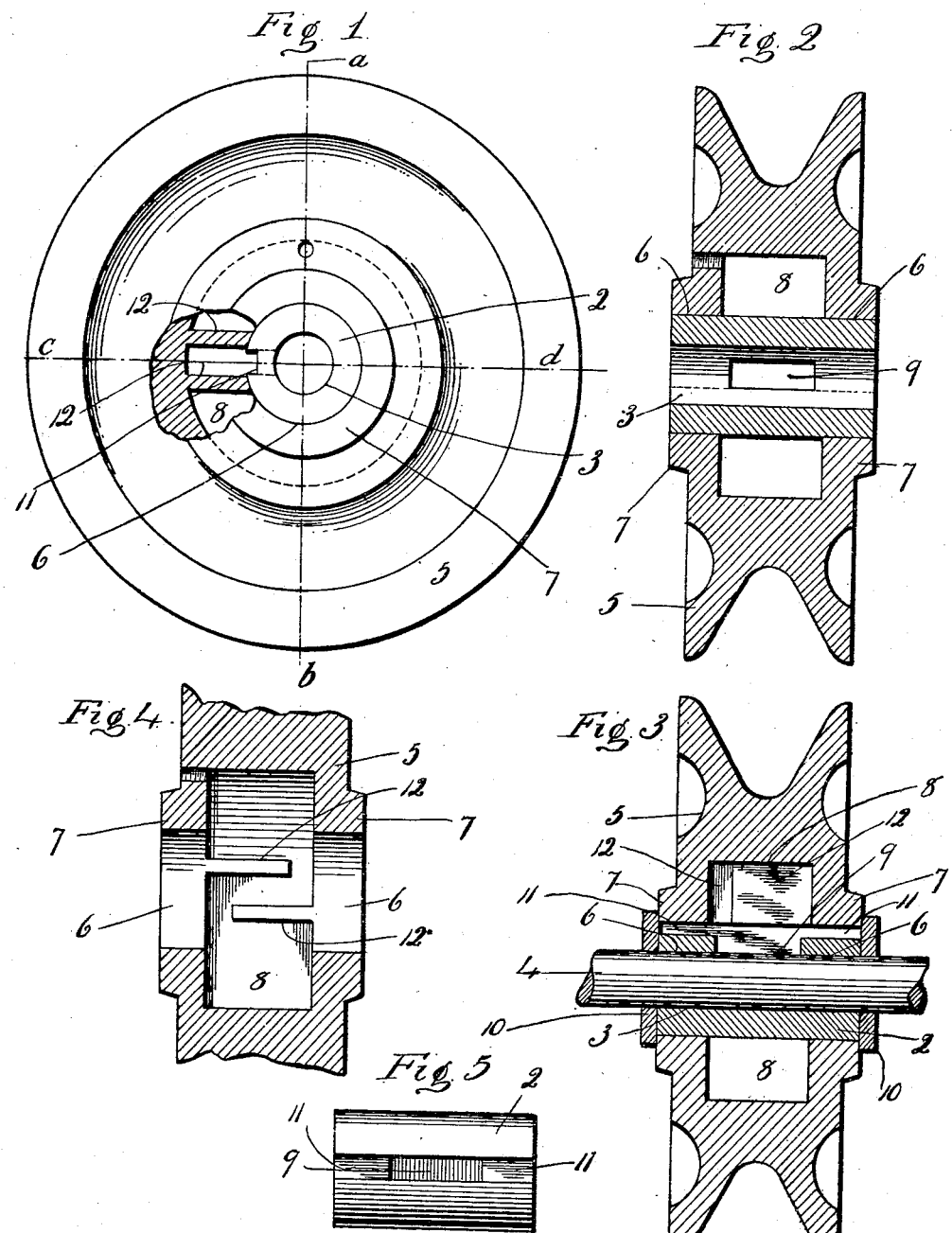

UNITED STATES PATENT OFFICE.

JOHN A. DEADY, OF MILLDALE, CONNECTICUT.

TROLLEY-WHEEL.

992,484.  Specification of Letters Patent.  Patented May 16, 1911.

Application filed October 3, 1910. Serial No. 585,071.

*To all whom it may concern:*

Be it known that I, JOHN A. DEADY, a citizen of the United States, residing at Milldale, in the county of Hartford and State of Connecticut, have invented a new and useful Improvement in Trolley-Wheels; and I do hereby declare the following, when taken in connection with the accompanying drawings and the letters of reference marked thereon, to be a full, clear, and exact description of the same, and which said drawings constitute part of this specification, and represent, in—

Figure 1 a side view of a trolley wheel constructed in accordance with my invention, a portion of the wheel being broken away showing the oil-deflecting partitions within the oil-chamber of the wheel. Fig. 2 a view of the wheel in vertical section on the line *a—b* of Fig. 1. Fig. 3 a similar view of the wheel in horizontal section on the line *c—d* of Fig. 1. Fig. 4 a broken view of the wheel in vertical section on the line *a—b* of Fig. 1 but with the bushing removed. Fig. 5 a plan view of the bushing.

My invention relates to an improvement in trolley-wheels, the object being to provide, at a low cost for manufacture, a simple, convenient and durable wheel composed of few parts and constructed with particular reference to guaranteeing a liberal and uniform oiling of the arbor.

With these ends in view my invention consists in a trolley-wheel having certain details of construction as will be hereinafter described and pointed out in the claim.

In carrying out my invention, I employ a bushing 2 formed of bronze or other metal, and having a central longitudinal arbor-hole 3 for the reception of the arbor 4. The said bushing is permanently mounted in the center of the trolley-wheel 5, being supported at its ends in corresponding openings 6 located opposite each other in the hubs 7 of the wheel the central portion of which is cored out to form a concentric oil-chamber 8 which entirely surrounds the unsupported central portion of the bushing as clearly shown in Figs. 2 and 3. For leading the oil directly from the chamber 8 to the arbor 4 passing through the hole 3, the bushing is formed with a centrally arranged radial port or opening 9 leading from its periphery into the arbor-hole 3. For leading oil from the chamber 8 to points outside of the wheel so as to lubricate the bearing of the flat outer faces of the hubs 7 upon the washers 10, I form the bushing 2 with shallow channels 11 leading in opposite directions from the ends of its radial port 9, and terminating against the inner faces of the washers 10 as clearly shown in Fig. 3. Now to insure the delivery of the oil in the chamber 8 to the radial port 9 and channels 11 of the bushing, I form two oil-deflecting ribs 12 in the chamber 8, these ribs being cast integral with the trolley-wheel 5, extending in opposite directions and located relatively near each other as shown in Fig. 4, it being designed that the bushing 2 shall be positioned in the holes 6 in the hubs 7 so that the port 9 and channels 11 of the bushing shall lie between the two ribs 12. It will be understood that the tendency of centrifugal force to carry the oil in the chamber 8 to the outer periphery thereof, and away from the bushing, will be defeated by the ribs 12 which will throw the oil inward upon that portion of the bushing containing the port 9 and channels 11.

I claim:—

The combination with a trolley-wheel formed with a concentric oil-chamber having oil-deflecting ribs extending into it from opposite directions and located relatively near together, of a bushing mounted in the wheel, passing through the center of the said oil-chamber and formed with a radial port for lubricating the arbor, and with longitudinal oil-channels for lubricating the outer bearings of the said wheel, the said bushing being positioned with its port and channels between the oil-deflecting ribs aforesaid.

In testimony whereof, I have signed this specification in the presence of two subscribing witnesses.

JOHN A. DEADY.

Witnesses:
CLARA L. WEED,
CLIFFORD J. REED.

Copies of this patent may be obtained for five cents each, by addressing the "Commissioner of Patents, Washington, D. C."